J. DRURY.
CRANK.
APPLICATION FILED DEC. 10, 1909.

958,104.

Patented May 17, 1910.
2 SHEETS—SHEET 1.

WITNESSES.

INVENTOR.
John Drury

J. DRURY.
CRANK.
APPLICATION FILED DEC. 10, 1909.

958,104.

Patented May 17, 1910.
2 SHEETS—SHEET 2.

WITNESSES.

INVENTOR.
John Drury
his attorneys

UNITED STATES PATENT OFFICE.

JOHN DRURY, OF LONDON, ENGLAND.

CRANK.

958,104.  Specification of Letters Patent.  Patented May 17, 1910.

Application filed December 10, 1909. Serial No. 532,483.

*To all whom it may concern:*

Be it known that I, JOHN DRURY, a subject of His Majesty the King of Great Britain, residing at Bayswater, London, England, have invented a certain new and useful Improvement in Cranks, of which the following is a specification.

This invention relates to cranks its object being to provide an improved construction of crank and its connected parts for driving or driven shafts with the purpose of obtaining certain advantages of drive, besides, in the case of a bicycle or other pedal-driven machine, increased convenience in working.

The invention being described with reference to the driving of a bicycle, its application to driving or driven shafts of other classes will be obvious.

It has been proposed to utilize for various purposes, including the driving of cycles, the action of a series of bars crossed and pivoted capable of being extended or contracted in length; such a system of bars is commonly known as lazy tongs; and a device of this known kind, or a series of links similarly disposed, is, according to the present invention, utilized to form part of or in conjunction with each of the cranks of which in the case of a bicycle there are of course two. Each of the lowermost members of each lazy tongs device embraces the shaft that is to be driven and carries means whereby it is caused for a certain period of revolution of the crank to have driving engagement with the shaft and for another period to be free from driving engagement therewith, one of said driving members being in, while the other is out of engagement; but the disposition of the parts is such that before either of said members becomes disengaged the other one comes into engagement so that for a moment they are both engaged.

The invention will now be described more fully with reference to the example thereof illustrated in the accompanying drawings, in which:—

Figure 1:
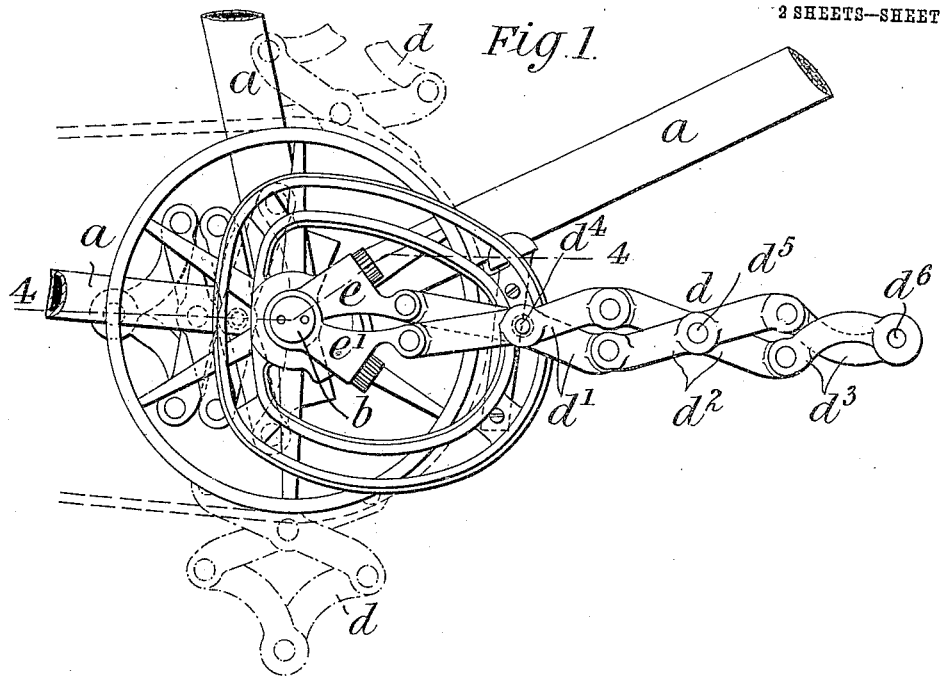
Figure 2:
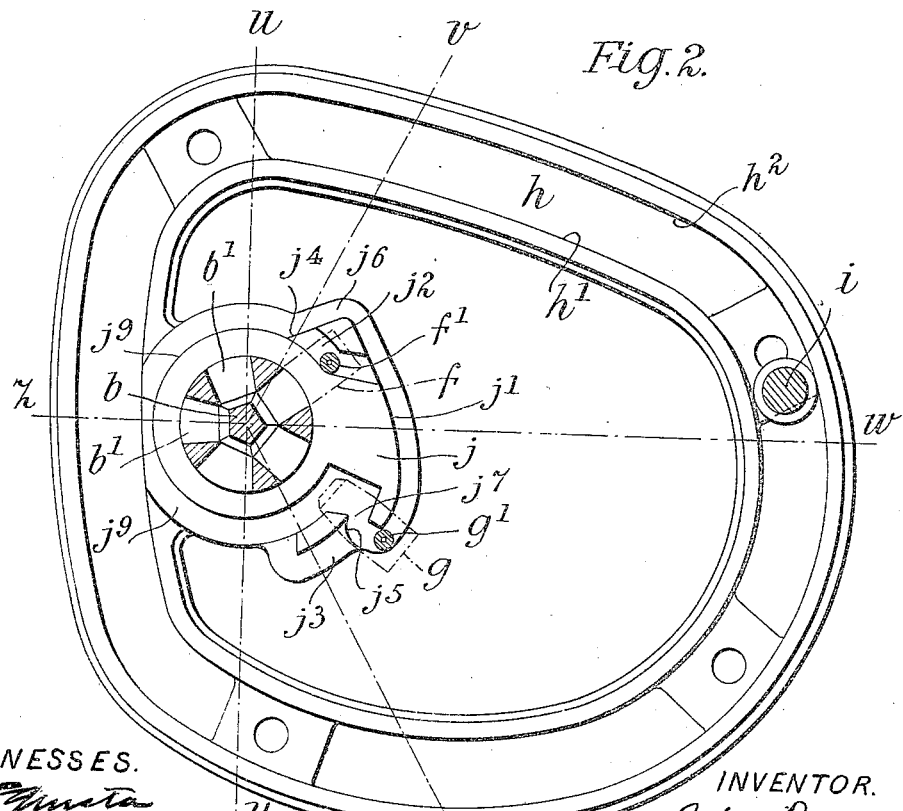
Figure 3:
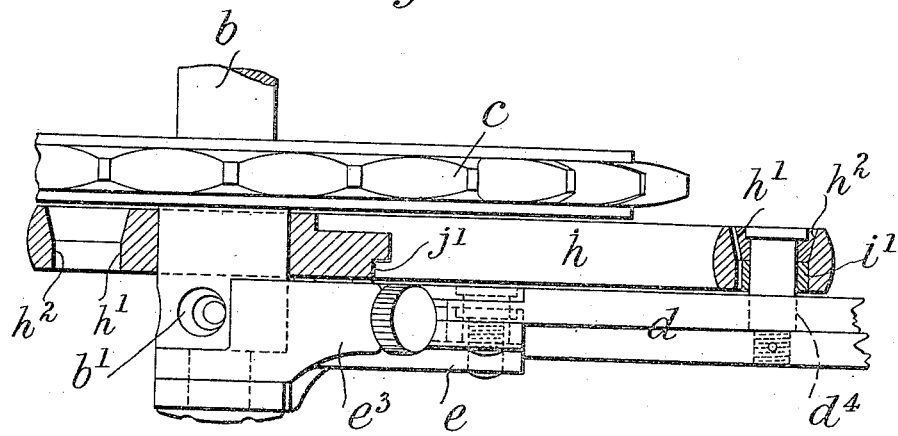
Figure 4:
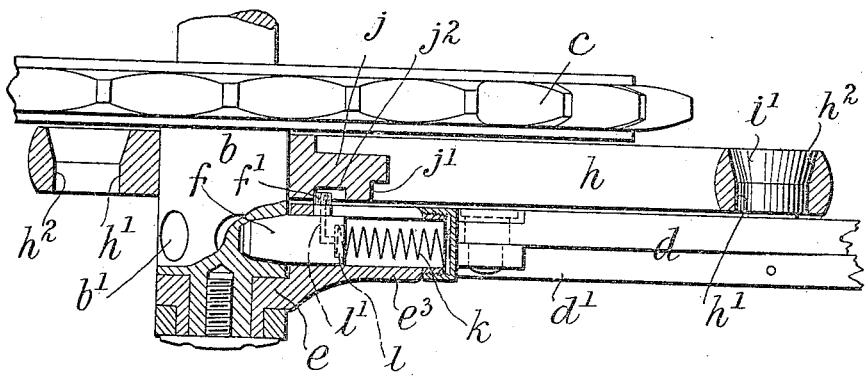

Figure 1 is an elevation of driving mechanism embodying the invention, and of a small portion of the frame of a bicycle carrying same; Fig. 2 is a detached view on a larger scale of one of two cam devices employed for guiding and for controlling the movements and operations of one of the cranks; Fig. 3 is a fragmentary sectional plan, also on the larger scale, of a portion of one pedal crank, the sprocket wheel and the driving shaft, the cam device being shown in section; and Fig. 4 is an enlarged section taken approximately on the line 4—4 of Fig. 1.

Referring to the said drawings: $a$ represents generally the frame of the bicycle, $b$ the crankshaft, $c$ the sprocket wheel, and $d$ either of the pedal cranks.

The cranks $d$ being similar it will be enough to describe one of them. It comprises a number of pairs of crossed bars $d'$ $d^2$ $d^3$ pivoted on centers $d^4$ $d^5$ $d^6$ respectively and jointed together at their adjacent ends. This is the preferred form of construction as it provides for a longer range of extension and contraction as to length, within narrow limits of width, than would be the case with, for instance, a lazy tongs device consisting of a single diamond shaped figure; with or without an extension in the form of part of a solid crank. At its lower end, that is to say at the end nearest the center, the crank comprises a pair of members $e$ $e'$ each having an eye that embraces the crank shaft $b$ and a recessed tail piece or socket portion $e^3$. These recessed parts $e^3$ carry, for a purpose to be hereinafter described, longitudinally slidable keys $f$, $g$, respectively, having laterally extending lugs or rollers $f'$ $g'$, respectively.

The cam devices above referred to are alike and therefore only one need be described. It comprises two cams, one of which is adapted to guide and actuate the lazy tongs structure of the crank and the other of which is adapted to guide and control the movements of the keys $f$ $g$. The former is represented generally by $h$ and comprises two cam surfaces, inner and outer, which are indicated at $h'$ and $h^2$ respectively. The crank carries on one of its pivot points, preferably the innermost one $d^4$, a pin $i$ on which is mounted an anti-friction roller $i'$, or other anti-friction device, adapted to ride on the cam surfaces $h'$ and $h^2$.

The cam $h$ serves to cause the lazy tongs device of the crank to become extended on and during the forward and downward motion of the crank, to become contracted during the rearward motion thereof and to remain more or less contracted during the upward motion thereof, as is already understood. The said cam however is of an improved and novel contour: its upper portion, approximately from the vertical line $u$ to approximately the horizontal line $w$, is comparatively straight and gently inclined, such incline, however, curving downward steeply near the line $w$; the forepart of the cam, corresponding with the most effective driving portion of the driving stroke of the crank, and extending say from a little above the horizontal line $w$ to within a short distance of the line $x$, may form a segment of a circle or of an approximately circular figure but eccentric to the crank (the center thereof being in the present instance a little below the horizontal line $w$ and about midway between the crank center and the inner contour of the cam); the portion extending from, say, a little forward of the line $x$ to a little way behind the line $y$ may be an increasingly steepening upward curve; and the rear portion may form practically a straight and more or less nearly vertical line. The other cam, indicated generally at $j$, is novel in its general aim and purpose as well as in its particular design and mode of construction. The general purpose of this cam is to enable certain driving advantages, above referred to, to be obtained, namely, that one revolution of the crank will effect more than a complete revolution of the crankshaft, and that there will be a certain overlap of work by the two cranks so that dead centers will be avoided. The said cam $j$ comprises a disk having a stepped or substantially L-shaped periphery the step or rabbet $j'$ in which forms a cam path for the lugs or rollers $f'$ and $g'$, and having shallower grooves $j^2$ $j^3$, for guiding said lugs or rollers out of the rabbet $j'$ at certain points.

The keys $f$ $g$ are provided with springs $k$ tending constantly to press them radially inward toward the axis of the crankshaft $b$ which latter is provided with a convenient number (in the present instance five) of radial holes or recesses $b'$ of a size such that the keys $f$ $g$ have an easy sliding fit in them. Within each of the keys $f$ $g$ is a reservoir or recess $l$ containing a lubricant; and leading from such recess is a channel $l'$ which opens on to the cam $j$ so as to keep same lubricated. The cam $j$, and also the cam $h$ and, if desired, any other working part may be provided with a suitable dust shield or guard to keep out dust and dirt. The various parts where necessary may also obviously be provided with suitable anti-friction devices.

Starting from the line $u$: when one crank is at this line one of its lowermost members—which may also be termed driving links—namely the one $e$, has its key $f$ engaged in one of the holes $b'$ and is therefore locked to the crankshaft, while the other driving link is free from said shaft; meanwhile the other pedal crank is at the line $x$. As the upper crank revolves the studs $f'$, $g'$ of the keys $f$ $g$ ride over the cam paths on the cam $j$: the stud $g'$, on the key $g$ of the other driving link $e'$ is longer than the stud $f'$ on the key $f$ of the driving link $e$, consequently the former penetrates into the deeper portions of the cam grooves and rabbets while the latter cannot reach said deeper portions. Assuming the cranks to be revolving clockwise, there is at the commencement or entrance end of the shallower groove $j^2$ a shoulder $j^4$; and at the commencement or entrance end of the groove $j^3$ there is a shoulder $j^5$: these shoulders as the crank revolves, respectively deflect the longer stud $g'$ away from the groove $j^2$ and from the groove $j^3$ and cause it to follow, in the former case the outer path $j^6$ and in the latter case the inner path $j^7$. The portion $j^6$ of the cam path is concentric with and near to the crankshaft, so that so long as the stud $f'$ was riding thereon the key $f$ was in engagement, under pressure of its spring, with one of the holes $b'$ in said shaft; on reaching the shoulder $j^4$ the stud $f'$, being too short to contact therewith, passes said shoulder and rides along the inner path $j^2$. Said path is upwardly inclined at its forward part and leads back into the peripheral rabbet; meanwhile, as the stud ascends the said inclined part the key $f$ is pulled out of the hole in the shaft in which it is engaged. The other stud $g'$, belonging to the key $g$, is long enough, on reaching the shoulder $j^5$, to strike same and be deflected thereby into the deep path $j^7$; on passing downward into said path its pin $g$ enters a hole in the crankshaft and locks the driving link therewith. It is to be noted, in connection with the cam $j$, that it is so designed that before either key $f$ or $g$, can be withdrawn from any hole the other one will always drop into a hole, so that for a moment both driving links will be keyed to the crankshaft: this will prevent objectionable jar or slip of the crank on the shaft.

At the moment of the greatest leverage of the crank, that is, when the crank pin $i$ moves downwardly and reaches the line $w$, Fig. 2, both of the keys $f$ and $g$ are in engagement with the crank shaft. In the position shown in Fig. 2, just short of the line $w$, the key $f$ is in engagement with one of the holes of the crank shaft, while the key $g$ is just about to engage it, its pin $g'$ being just in the act of falling down into the groove $j^5$, and this engagement will have taken place when the pin $i$ reaches the line $w$.

One or the other of the keys $f$, $g$ is out of engagement almost all of the time, even in the near neighborhood of the point of greatest leverage. For instance, when the crank pin $i$ reaches the line $w$, the key $f$ is beginning to be disengaged by reason of its pin $f'$ riding outwardly in the path $j^2$. At no time, however, are the two keys $f$ and $g$ ever out of engagement together, and when one is out, the other is in and the crank goes on working with the engaged key, the second key being engaged before the first key is drawn out of the crank shaft, so that there will be no slip.

It is not necessary that both of the keys should be in, to enable the crank to drive or to be driven; on the contrary, they would not work as well if they were continuously engaged for any considerable length of time, for the reason that the angle between the links or driving members $e$, $e'$ is constantly changing; above the line $w$ these driving members approach each other, so that the member $e'$ has a slight recessional or counter-clockwise movement (or lag) relatively to the driving member $e$, while below the line $w$ the members $e$, $e'$ are moving away from each other, so that the driving member $e$ has a slight recessional movement or lag relative to the member $e'$. Thus one driving member moves for a time, at the same speed as the crank, and drives the shaft, while the other one lags, to permit the expansion or contraction of the crank; then the converse takes place, the formerly lagging member taking up the work of driving, and allowing the one that had up to that time been driving, to lag. It is, of course, understood that there is a compound crank on each end of the main driving shaft, and that, generally speaking, when one is working the other is idle.

The lagging feature already described is an essential feature of the invention, because, in the first place, it is necessary in order to make the lazy-tongs form of crank practicable, and because, in the second place, it enables the work of the two pedals to overlap.

It is, of course, evident from the construction described that when one of the keys $f$ or $g$ reënters a slot or hole in the shaft, that slot or hole will be behind the one that it formerly engaged. This overlapping of the work of the pedals embodies the main point of the invention; namely, that the cranks are not always 180° apart, nor at any fixed angle, but are continually changing their relative positions, each crank in turn partially overtaking the other and then dropping back.

The cams $h$ and $j$ are so shaped relatively to each other that when the crank as a whole has reached the horizontal position, represented by the line $w$ the other crank will be at the diametricaly opposite line $z$; when it has advanced to the vertical line $y$ the other pedal is at the line $v$, that is to say well past the dead center. In this way dead centers are avoided and moreover there is this driving advantage, that the movement of the crank from a vertical to a horizontal line that is through an angle of 90 degrees may cause the spindle or shaft to be revolved through an angle of say about 140 degrees when one of the lower members or driving links disengages with the shaft at about which time the other lower member or driving link of the same crank engages and in turn the crank's movement through another 90 degrees will impart a further 140 degree revolution of the shaft at about which period a lower member or driving link of the second crank will have begun to act.

The second crank has of course the same effect on the spindle or shaft on its down stroke and the cam being so formed or placed a corresponding motion may be imparted on the upstrokes of both cranks.

It will be obvious that the downward or operative movement of the crank on one side will carry up the other crank on its backward or non effective movement on the other, as the keys of both are then in engagement.

What I claim as my invention and desire to secure by Letters Patent is:—

1. The combination of a shaft, a crank thereon comprising a plurality of driving members or links, means for causing one of said driving members or links to engage with the shaft during a portion of the revolution of the crank and to be free from driving engagement with the shaft during another portion of said revolution, and independent means for causing another of said driving members or links likewise to be engaged with the shaft during one portion, and disengaged therefrom during another portion of said revolution.

2. In a driving crank mechanism the combination of a shaft, a crank comprising a plurality of driving members or links thereon, an engagement device for each of said driving members or links adapted to engage said shaft, and means for actuating said engagement devices independently of each other so that each engagement device will lock the corresponding driving link or member on the shaft for a predetermined portion of the revolution of the crank and will release said driving link or member from the shaft for another predetermined portion of said revolution.

3. The combination of a shaft, a crank thereon comprising two members, a separate engagement device for each member for locking said member with the shaft, and means for actuating or controlling said engagement devices as to cause each one to lock the corresponding crank member on the shaft during a portion of its revolution and to unlock said member during another portion of said revolution, said actuating or controlling means being so timed that one of the engagement devices controlled thereby will be in, while the other is out of engagement.

4. The combination of a shaft, an extensible and contractible crank thereon comprising a plurality of members adjacent said shaft and a plurality of links or members jointed to said first named links or members remote from the shaft, cam means engaging said crank for causing same to extend and contract during revolution, and means for locking each of said first named members with the shaft at different times from each other but at predetermined periods of said revolution, and likewise unlocking each of said members at different times from each other, but at predetermined times in said revolution.

5. The combination of a shaft, an extensible and contractible crank thereon comprising a plurality of links or members adjacent said shaft and a plurality of links or members jointed to said first named links or members, cam means engaging said crank for causing same to extend and contract during revolution, means independent of each other for locking and unlocking each of said first named links or members relatively to the shaft, and means for actuating or controlling said locking and unlocking means so as to cause each to be locked during a predetermined part of the revolution and unlocked during another part thereof, said controlling means being adapted to cause one of the locking devices to be out of engagement while another locking device is in engagement.

6. The combination of a shaft, an extensible and contractible crank thereon comprising a plurality of driving members adjacent the shaft and a plurality of link members jointed to said driving members, cam means engaging said crank for causing same to extend and contract during revolution; a movable key member on each of said driving members; and a cam adapted to control said key members so as to cause them to lock and unlock said driving members relatively to the shaft at predetermined times in the revolution of the crank.

7. The combination of a driven shaft, a plurality of driving cranks thereon each comprising parts so jointed together that the relative movements of said parts will cause extension and contraction of the respective cranks; means for controlling such expanding and contracting movements during revolution; means for so connecting said cranks to the shaft as to permit each crank in turn to move at a different speed from that of the shaft for a part of the revolution of the crank; and means for so controlling said connection that each crank revolves with the shaft during one predetermined part, and can move at said different speed during another part of every revolution, said controlling means being so disposed relatively to the cranks as to cause an overlap of work of the cranks.

In testimony whereof I have set my hand in the presence of two subscribing witnesses.

JOHN DRURY.

Witnesses:
ALLEN PARRY JONES,
EDWARD T. FOSTER.